United States Patent
Liu et al.

(10) Patent No.: US 8,707,189 B2
(45) Date of Patent: Apr. 22, 2014

(54) METHODS, COMPUTER PROGRAM PRODUCTS, AND HARDWARE PRODUCTS FOR PROVIDING INTERACTIVE PROGRAM GUIDE AND INSTANT MESSAGING CONVERGENCE

(75) Inventors: Jerry C. Liu, Atlanta, GA (US); Brian K. Daigle, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 850 days.

(21) Appl. No.: 12/238,744

(22) Filed: Sep. 26, 2008

(65) Prior Publication Data

US 2010/0083182 A1    Apr. 1, 2010

(51) Int. Cl.
G06F 3/00    (2006.01)
G06F 13/00    (2006.01)

(52) U.S. Cl.
USPC .............................. 715/758; 715/719; 725/39

(58) Field of Classification Search
USPC .......................... 715/719, 721, 758, 821, 858
See application file for complete search history.

(56) References Cited

U.S. PATENT DOCUMENTS

| 5,828,839 | A * | 10/1998 | Moncreiff | 709/204 |
|---|---|---|---|---|
| 6,081,830 | A * | 6/2000 | Schindler | 709/204 |
| 6,430,602 | B1 * | 8/2002 | Kay et al. | 709/206 |
| 7,478,414 | B1 * | 1/2009 | Glusker et al. | 725/9 |
| 7,684,815 | B2 * | 3/2010 | Counts et al. | 455/518 |
| 7,828,661 | B1 * | 11/2010 | Fish et al. | 463/42 |
| 7,962,935 | B2 * | 6/2011 | Kurosaki et al. | 725/40 |
| 8,024,765 | B2 * | 9/2011 | Ramanathan et al. | 725/110 |
| 8,086,679 | B2 * | 12/2011 | Nobori et al. | 709/206 |
| 8,181,201 | B2 * | 5/2012 | Goldenberg et al. | 725/46 |
| 8,219,133 | B2 * | 7/2012 | Counts et al. | 455/517 |
| 8,230,456 | B2 * | 7/2012 | Jacoby et al. | 725/9 |
| 2001/0051989 | A1 * | 12/2001 | Moncreiff | 709/206 |
| 2002/0112239 | A1 * | 8/2002 | Goldman | 725/46 |
| 2003/0078972 | A1 * | 4/2003 | Tapissier et al. | 709/204 |
| 2003/0101450 | A1 * | 5/2003 | Davidsson et al. | 725/32 |
| 2003/0140103 | A1 * | 7/2003 | Szeto et al. | 709/206 |
| 2003/0225833 | A1 * | 12/2003 | Pilat et al. | 709/204 |
| 2004/0117831 | A1 * | 6/2004 | Ellis et al. | 725/53 |
| 2004/0231003 | A1 * | 11/2004 | Cooper et al. | 725/135 |
| 2005/0149987 | A1 * | 7/2005 | Boccon-Gibod et al. | 725/135 |
| 2006/0130109 | A1 * | 6/2006 | Zenith | 725/110 |

(Continued)

OTHER PUBLICATIONS itvdictionary.com, "Electronic Program Guide (EPG) & Interactive Program Guide (IPG)", internet article retrieved from http://www.itvdictionary.com/epg_ipg.html; pp. 1-3; article retrieved on Sep. 25, 2008.

*Primary Examiner* — Robert Stevens
*Assistant Examiner* — Phoebe Pan
(74) *Attorney, Agent, or Firm* — Cantor Colburn LLP

(57) ABSTRACT

Interactive program guide (IPG) and instant messaging (IM) convergence is provided by displaying an IPG that includes one or more IM icons. In response to detection of a user clicking on an icon of the one or more displayed IM icons or hovering over an icon of the one or more displayed IM icons, a pull-down menu is displayed that includes one or more IM options or a new screen is displayed that includes one or more instant messaging options. The pull-down menu or new screen displays a list of all IM users that are watching a program in a particular geographic location. Alternatively or additionally, the pull-down menu or new screen displays a list of all buddies for the user that are watching a program listed in the IPG.

6 Claims, 13 Drawing Sheets

(56) References Cited

U.S. PATENT DOCUMENTS

| | | | |
|---|---|---|---|
| 2007/0198738 A1* | 8/2007 | Angiolillo et al. | 709/231 |
| 2007/0250866 A1* | 10/2007 | Yamada | 725/58 |
| 2009/0007179 A1* | 1/2009 | Angiolillo et al. | 725/44 |
| 2009/0132914 A1* | 5/2009 | Matsuyama et al. | 715/700 |
| 2009/0249223 A1* | 10/2009 | Barsook et al. | 715/753 |
| 2011/0047487 A1* | 2/2011 | DeWeese et al. | 715/758 |
| 2011/0119595 A1* | 5/2011 | Bydeley et al. | 715/738 |
| 2011/0173672 A1* | 7/2011 | Angiolillo et al. | 725/118 |

* cited by examiner

FIGURE 8

| Adelphia | | | 7:03pm | TV GUIDE |
|---|---|---|---|---|
| Weather Center 7-9p Forecasts and tips on gardening. (Other) | | | 34 TWC | |
| THUR ▽ | 7:30p | 8:00p | 8:30p △ | |
| 34 TWC | Weather Center | | | 🐾 801 |
| 35 USA | Walker, Texas Ranger 🐾 | Law & Order: Special Victims Unit | | 🐾 |
| 36 NICK | Fairly OddParents 🐾 | Jimmy Neutron 🐾 | All Grown Up | 🐾 |
| 37 FAM | Switched! 🐾 | Knock First 🐾 | Full House | 🐾 |
| Quick Tip #1: | | | | Click Here |
| Get immediate access to guide features with Quick Menu | | | | |

| 7:03 | 7:00p | 7:30p | 8:00p |
|---|---|---|---|
| 2 CBS | King Of Queens | Charlie Brown | Everybody Loves Raymond |
| 3 ABC | The Wonderful World of Disney Return to Pirate Castle | | Monday Night Football |

Picture of a program

1000

1001

METHODS, COMPUTER PROGRAM PRODUCTS, AND HARDWARE PRODUCTS FOR PROVIDING INTERACTIVE PROGRAM GUIDE AND INSTANT MESSAGING CONVERGENCE

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

Exemplary embodiments relate generally to instant messaging and, more specifically, to techniques for providing convergence between instant messaging and interactive program guides.

Instant messages are electronic messages sent from device to device within an instant messaging (IM) community. Each of the devices displays a sequence of incoming and outgoing messages, typically in the form of a textual dialogue representing a conversation. However, these messages may include voice, video, still images, or electronic files in addition to, or in lieu of, text. IM differs from e-mail in that IM conversations occur in real time. Whereas email is a correspondence-based form of communication, IM provides users with the reassurance and satisfaction of receiving immediate replies. Accordingly, IM has experienced wide popularity among users of all ages.

One feature commonly offered by IM service providers is that a user can set up a list of contacts including friends, family members, colleagues, and others. The contact list is generally referred to as a "buddy list", with each contact on the list known as a "buddy". A user who is a member of an instant messaging (IM) community has a unique identifier in that community and can be added to the contact list of another member of the community using that unique identifier. This identifier (ID) is sometimes referred to as a contact name or buddy name. For example, short messaging service (SMS) is a form of IM that is available within the community of mobile telephone users, wherein the telephone number assigned to a mobile telephone functions as the unique identifier.

Another feature commonly offered by IM service providers is presence awareness. This feature provides an indication to a user specifying whether or not each of the buddies in the user's contact list is currently online and available to chat. At present, IM users can implement instant messaging using any of a plurality of device types such as wireless telephones, laptop computers, personal digital assistants (PDAs), Internet Protocol television (IPTV)-capable devices, and others. These devices may be utilized in conjunction with any of a variety of different communication platforms, such as wireless telephony, IP-based communication, and others. Existing techniques for indicating presence awareness indicate that a desired message recipient is online and available to receive a message.

An interactive program guide (IPG) is a user-interactive, on-screen guide to scheduled broadcast television or radio programs which allows a viewer to navigate, select, and discover content by time, title, channel, genre, etc, by use of a remote control, keyboard, keypad, or other input mechanism. IPG technology is based upon broadcasting data to an application residing within middleware in a computing device, such as a set-top box, which connects to the television set and enables the application to be displayed. By navigating through an IPG, users are provided with information about current programs and future programs. When an IPG is connected to a digital video recorder (DVR), the IPG enables a viewer to plan his or her viewing and record broadcast programs to a hard disk for later viewing.

Typical elements of an IPG comprise a graphical user interface which enables the display of program titles, descriptive information such as a synopsis, actors, directors, year of production, and so on, the name or identity of the channel carrying the program, and the programs on offer from sub-channels such as pay-per-view and video-on-demand (VOD) services, program start times, genres and other descriptive metadata. The information is typically displayed on a grid with the option to select additional information for each program. In the case of radio programs, IPGs offer text-based displays of program name, program description, genre, on-air or off air, artist, album and track title information. An IPG allows the viewer to browse program summaries, search by genre or channel, immediately access the selected program, reminders, and implement parental control functions. An IPG may also be used to enable one-touch recording of programs.

From time to time, a viewer watching a broadcast program may wish to communicate with a buddy on the viewer's contact list. The purpose of the communication may be to discuss one or more aspects of the program, to share opinions or viewpoints regarding the program, or perhaps to discuss subject matter that is not related to the program. Pursuant to existing state of the art technology, the viewer uses a personal computer, laptop computer, personal digital assistant, or other portable internet-capable device to ascertain whether his or her buddy is online and, if so, one or more of the foregoing devices may be used to initiate communications with the buddy. Unfortunately, the process of determining whether or not a buddy is online distracts the viewer from the program being viewed. Moreover, the viewer must utilize one device to watch the program and another device to contact and communicate with his or her buddies.

SUMMARY

Exemplary embodiments relate to a method for providing IPG and IM convergence. An IPG is displayed that includes one or more IM icons. Responsive to detection of a user clicking on an icon of the one or more displayed IM icons or hovering over an icon of the one or more displayed IM icons, a pull-down menu is displayed that includes one or more IM options, or a new screen is displayed that includes one or more IM options. The pull-down menu or new screen displays a list of all IM users that are watching a program in a particular geographic location. Alternatively or additionally, the pull-down menu or new screen displays a list of all buddies for the user that are watching a program listed in the IPG. Alternatively or additionally, the pull-down menu or new screen provides an option for adding a program listed on the IPG to an IM community of the user or add the user to a group for the program, thereby enabling the user to communicate with one or more other members of the group.

A computer program product and a hardware product corresponding to the foregoing method are also disclosed herein. Other methods, computer program products, and hardware products according to embodiments will be or become apparent to one with skill in the art upon review of the following drawings and detailed description. It is intended that all such additional methods, hardware products, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 8 illustrates a second exemplary embodiment of a graphical user interface for displaying one or more IM presence indicators in an IPG.

FIG. 10 illustrates a fourth exemplary embodiment of a graphical user interface for displaying one or more IM presence indicators in an IPG.

The detailed description explains the exemplary embodiments, together with advantages and features, by way of example with reference to the drawings.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Television services are provided to one or more subscribers or users over a network. A service provider transmits general television content, such as broadcast television programs, and an interactive program guide that is customized for each subscriber or user. Subscribers or users communicate with the service provider to perform any number of tasks, including establishing an account, ordering customized content, and sharing content with other subscribers or users. Reference will now be made in detail to various exemplary embodiments disclosed herein, examples of which are illustrated in the accompanying drawings. Wherever possible, the same reference numbers will be used throughout the drawings to refer to the same or like parts.

System Overview

Figure 1:
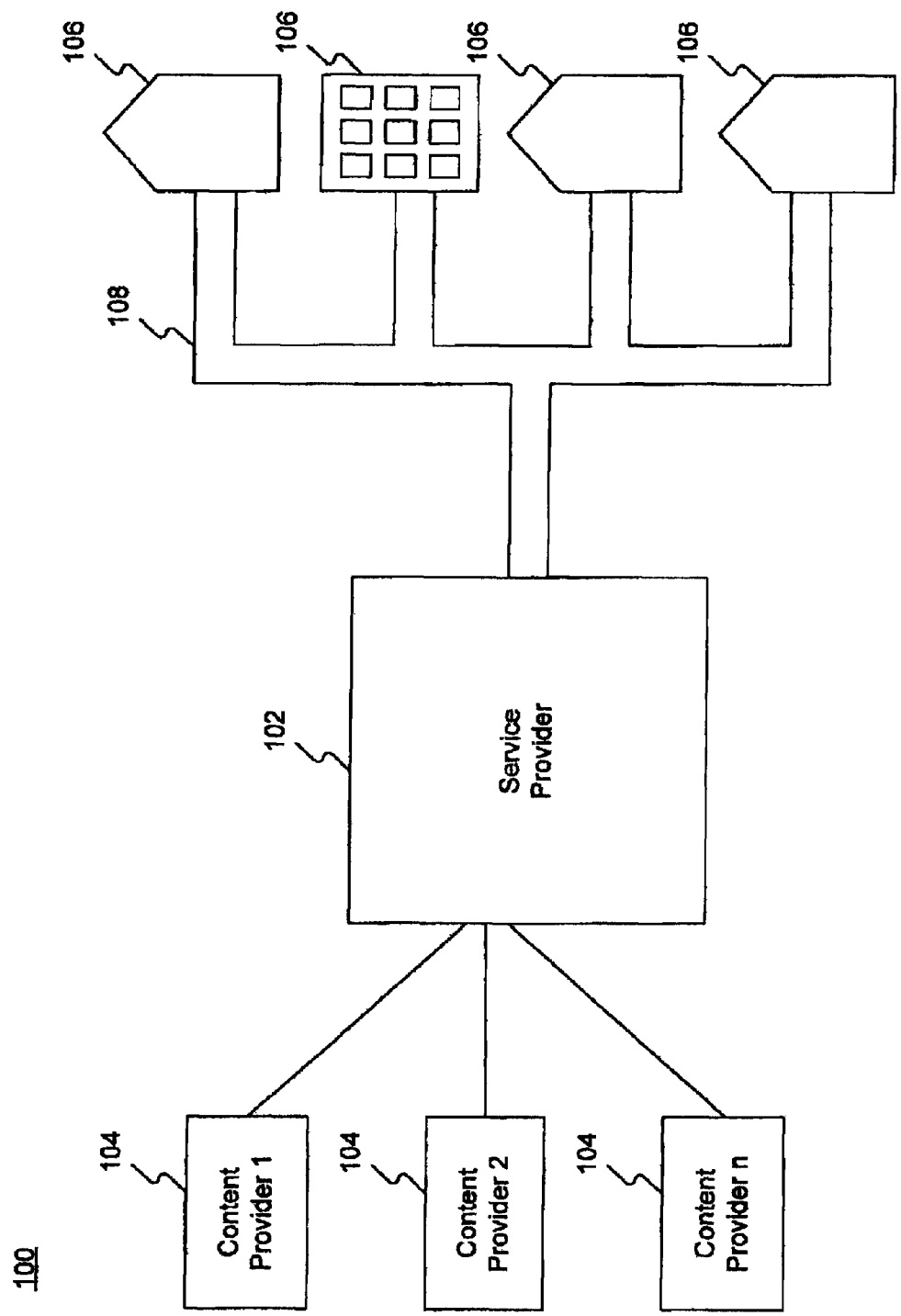
FIG. 1 is a hardware block diagram of an illustrative system for providing interactive program guide (IPG) and instant messaging (IM) convergence, according to exemplary embodiments.

FIG. 1 is a hardware block diagram of an illustrative system 100 for providing interactive program guide (IPG) and instant messaging (IM) convergence. A service provider 102 collects content (e.g., broadcast video, broadcast audio, audio/video on demand, data content), from one or more content providers 104. Such content may include, for example, programming from local broadcast television channels, programming from national broadcast television content providers, such as Home Box Office™ or ESPN™, and educational programming such as distance learning broadcasts. The service provider 102 transmits data, including the audio/video content, to subscribers 106 via an access network 108. The subscribers 106 are shown for explanatory purposes, it being understood that the subscribers 106 may alternatively or additionally represent users that do not actually subscribe to the system 100. Thus, the subscribers 106 may include homes, businesses, and hotels, as well as hotel guests who may, in fact, not be actual subscribers to the system 100.

The access network 108 may include, for example, fiber optic cables and connectors, enabling high speed, two-way communication between the service provider 102 and the subscribers 106. Alternatively or additionally, the access network 108 may also include other networking technologies, such as wireless networking. In one embodiment, the service provider 102 and the subscribers 106 may also be able to communicate via alternate networks that may interconnect the service provider 102 and the subscribers 106, such that the access network 108 represents the Internet.

Figure 2:
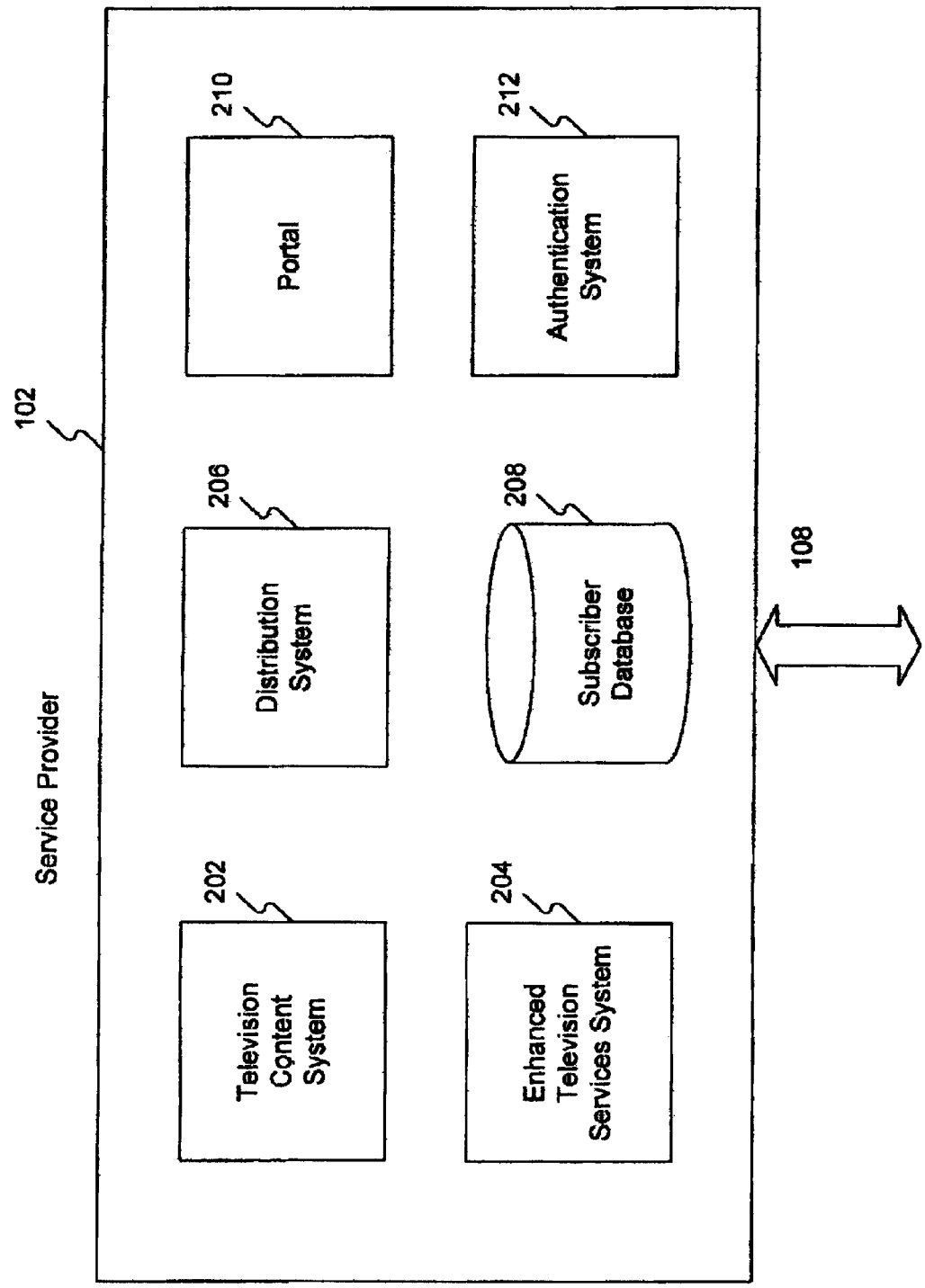
FIG. 2 is a hardware block diagram of an illustrative service provider for providing IPG and IM convergence, according to exemplary embodiments.

FIG. 2 is a hardware block diagram of an illustrative service provider, such as the service provider 102, for providing interactive program guide (IPG) and instant messaging (IM) convergence. The service provider 102 (FIGS. 1 and 2) may provide multiple services to the subscribers 106 (FIG. 1). For example, the service provider 102 (FIGS. 1 and 2) may establish and maintain subscriber accounts, provide regular broadcast television programming, provide on-demand video content, and enable subscriber feedback. The service provider 102 may also enable the subscribers 106 (FIG. 1) to obtain enhanced services, such as described below.

The service provider 102 (FIGS. 1 and 2) may include various systems and facilities to receive, store, process and transmit content for provision to the subscribers 106 (FIG. 1). For example, the service provider 102 (FIG. 2) may include a television content system 202, an enhanced television services system 204, a distribution system 206, a subscriber database 208, a portal 210, and an authentication system 212. The television content system 202 may receive, store, process and transmit broadcast television content originated by the content providers 104 (FIG. 1). In one embodiment, the service provider 102 may also create television content and store and transmit such content using the television content system 202 (FIG. 2). The enhanced television services system 204 may receive, store, process and transmit data to support enhanced television services and provide subscriber interfaces for accessing enhanced television services. According to exemplary embodiments, these services include providing an interactive program guide (IPG) that is customized for each of a plurality of users to include instant messaging (IM) presence information for each of a plurality of buddies associated with each of the plurality of users, or wherein the IPG includes IM presence information for each of a plurality of program viewers for a specific program, as will be described in further detail hereinafter with reference to FIG. 6.

The distribution system 206 may distribute content and data, e.g., from the television content system 202 or the enhanced television services system 204, to the subscribers 106 (FIG. 1). The distribution system 206 (FIG. 2) may perform broadcast/multicast delivery (e.g., to send the same information to many subscribers simultaneously) or unicast delivery (e.g., to send customized content to a single subscriber). The distribution system 206 may also provide an "upstream" communications path from the subscribers 106 (FIG. 1) to, for example, the enhanced television services system 204 (FIG. 2), such that subscribers may send requests and other information related to obtaining customized content, among other things.

The subscriber database 208 may store data about the subscribers 106 (FIG. 1) such as name, address, subscriptions to enhanced services, or other types of data. The portal 210 (FIG. 2) may provide an interface for communications with the service provider 102 (FIG. 1) via an external network, such as the public switched telephone network (PSTN) or a wide area network such as the Internet. The authentication system 212 (FIG. 2) may process authentication and/or authorization information to enforce security and privacy for providing services to the subscribers 106 (FIG. 1).

One of ordinary skill in the relevant art will recognize that the service provider 102 (FIG. 2) may include more or fewer components than are shown in FIG. 2, and more functionality or less functionality or combined functionality compared to that illustrated in FIG. 2. For example, a separate database may be provided to store authentication information used by the authentication system 212. In another example, the service provider 102 may include telecommunications and/or conference bridge facilities to enable the subscribers 106 (FIG. 1) to access audio/video telecommunications and/or teleconference services (e.g., available through enhanced television services). Additionally or alternatively, the functionality of the service provider 102 (FIG. 2) may be performed by a single system, or by a combination of computers and other equipment, which may be distributed over multiple locations and interconnected by various communications links.

FIGS. 3(*a*) and 3(*b*) are exemplary hardware block diagrams showing illustrative systems for converging interactive program guide (IPG) and instant messaging (IM) functionality. As shown in FIG. 3(*a*), the subscriber 106 receives transmissions from the service provider 102 via the access network 108 at a network terminal 302. As described above, the access network 108 may be, for example, a passive optical network (PON). The network terminal 302 may receive the network transmissions from the service provider 102 via any number of intermediate components/technologies. For example, an optical-to-electrical conversion component may be interposed between the network terminal 302 and the service provider 102 in order to convert optical transmissions to electrical signals (e.g., RF signals, POTS signals, Ethernet signals), as well as other transport components that may be deployed therebetween.

The network terminal 302 processes data received via the access network 108 and presents it to output devices 304. As such, the network terminal 302 may include processors, storage systems, network interfaces (e.g., to the access network 108) and device interfaces, as generally known. The output devices 304 can include any number of components with the capabilities to output audio and/or video, such as video displays, speakers, and television sets. The network terminal 302 is also connected to one or more input devices 306, which allow users to provide input data, for example, to control the network terminal 302 or the output devices 304, or provide data for upstream transmission over the access network 108.

The input devices 306 may include one or more devices such as keyboards, pointing devices, remote controllers, and touch screens. In certain embodiments, the network terminal 302 may be integrated with any or all of the output devices 304, as well as any or all of the input devices 306 (an example of which would be a mobile telephone). In some embodiments, the subscriber 106 may also use a separate computing system or telecommunications device such as a telephone (not shown) connected to an external network (e.g., PSTN, Internet, wireless network) to communicate with the service provider 102 (e.g., via the portal 210).

FIG. 3(*b*) is a hardware block diagram showing an exemplary embodiment for providing television service, and for converging interactive program guide (IPG) and instant messaging (IM) functionality, at a subscriber, such as the subscriber 106, or user premises. As shown in FIG. 3(*b*), the network terminal is a set top box 312 connected to the access network 108 (e.g., implemented via any of various technologies/components) to communicate with the service provider 102. The set top box 312 is connected to a television 314 or other media presentation device, and which includes facilities to display video and produce audio based on signals provided by the set-top box 312. A remote control 316 and other input devices (e.g., pushbuttons) are provided and may be communicatively connected to the television 314 and/or set-top box 312 (e.g., wirelessly) to enable a viewer, user, or the subscriber 106 (FIG. 2) to control the television 314 (FIG. 3(*b*)) and/or the set top box 312, and to provide data which may be transmitted over the access network 108 to the service provider 102, and/or to one or more other subscribers (i.e., the subscriber 106, FIG. 2) or users.

The subscriber 106 may set up an account with the service provider 102 (FIGS. 2 and 3(*b*)) which enables and/or controls the ability to receive enhanced television services. For example, the subscriber account may be used by the service provider 102 to store subscriber identification information, such as a name and address, instant messaging (IM) screen name or identifier, indications of which services a subscriber is authorized to receive, such as premium broadcast channels or Internet access, and track and bill for enhanced services, such as viewing of personalized content, etc. The account may also store an identifier of the subscriber's network terminal 302 that allows for identification of the network terminal over the access network 108 (e.g., a unique identifier of the set top box 312 assigned to the subscriber), facilitating the delivery of enhanced television services to the subscriber. The subscriber 106 may access account information, for example, using the portal 210 via voice communications (e.g., an interactive voice response system) or data communications (e.g., an interactive web interface over the Internet). Alternatively, the subscriber 106 may use a phone integrated into the set top box 312 or controls available in the remote control 316 to communicate with the service provider 102 over the access network 108.

The subscriber 106 may include several users and their equipment. For example, within a single household, different family members may desire to receive different content or subscribe to different enhanced television services from the service provider 102. In one embodiment, the subscriber 106 (e.g., a household) may establish an account with the service provider 102 and each user (e.g., family members in the household) is associated with that account and may have information stored in the subscriber database 208. In another embodiment, each user may establish his or her own account and his or her own IM screen name with the service provider 102.

Figure 3A:
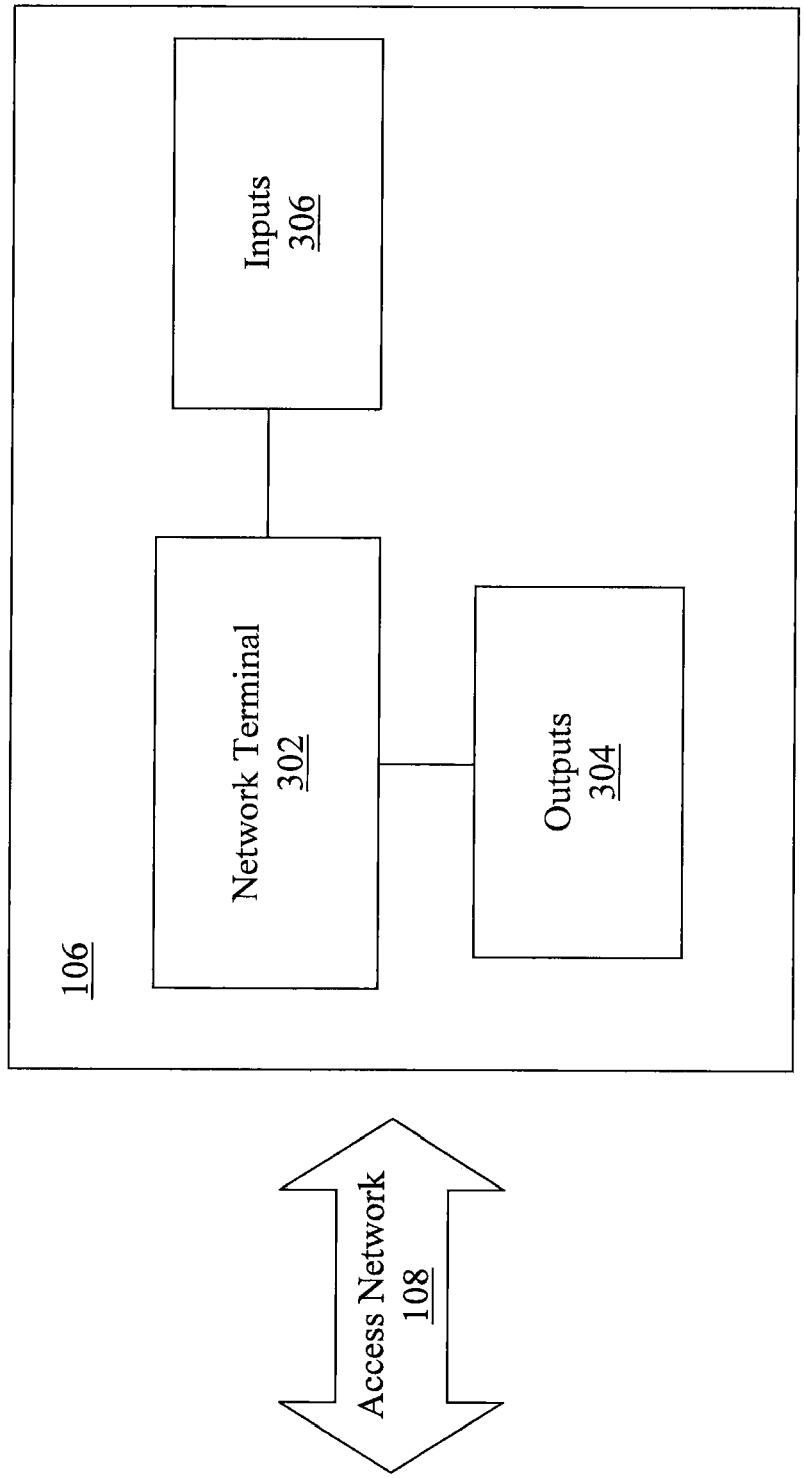
FIGS. 3(a) and 3(b) are exemplary hardware block diagrams showing illustrative systems for converging IPG and IM functionality.
Figure 3B:
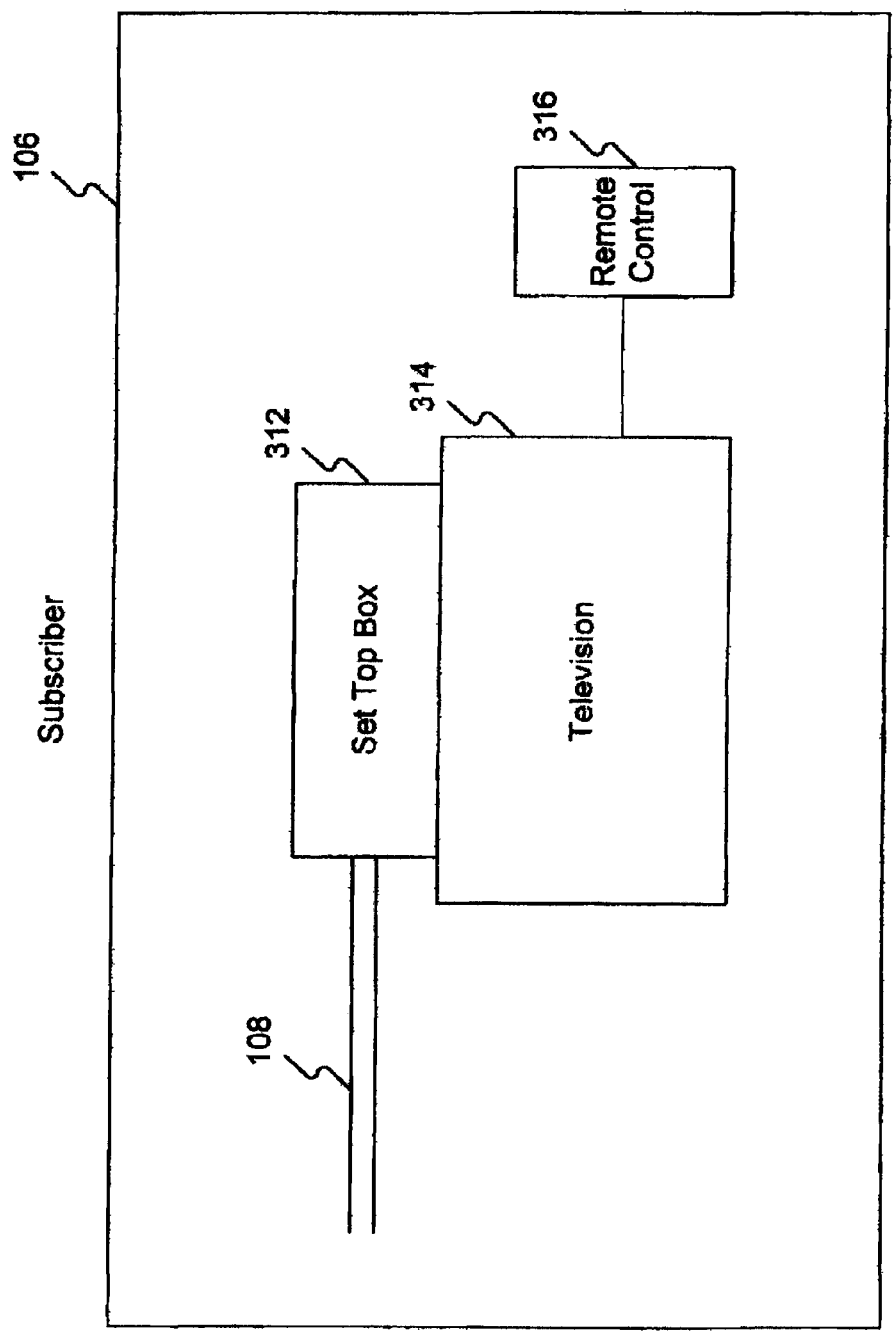
Figure 4:
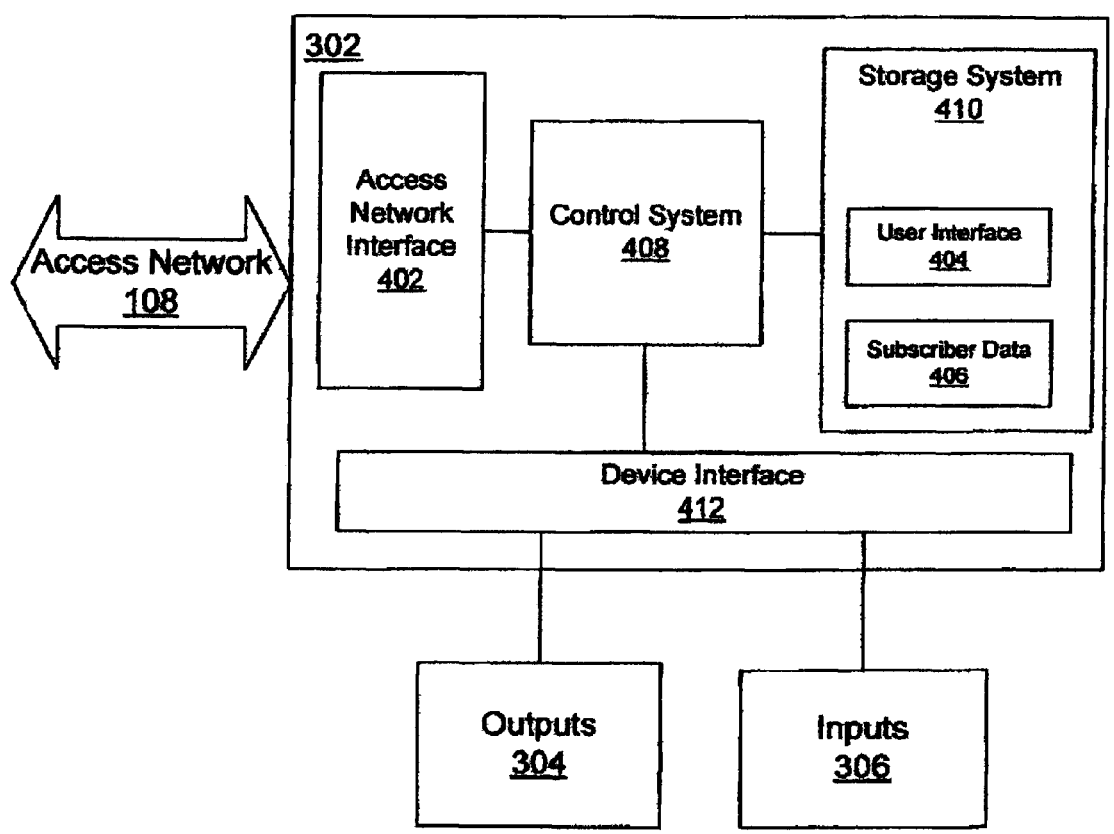
FIG. 4 is a detailed block diagram of an illustrative network terminal for converging IPG and IM functionality, according to exemplary embodiments.

FIG. 4 is a detailed block diagram of an illustrative network terminal, such as the network terminal 302, for converging interactive program guide (IPG) and instant messaging (IM) functionality. The preferred network terminal 302 may, but need not, be implemented using the set top box 312 of FIG. 3(*b*). The network terminal 302 (FIG. 4) may include an access network interface 402, a control system 408, a storage system 410, and a device interface 412. The control system 408 may include processors or other control logic, which may be used to execute various instructions and manipulate data stored in the storage system 410. The storage system 410 may include various storage devices and controllers, such as semiconductor memories (e.g. RAM, ROM, flash), magnetic memories (e.g., disk), optical memories (e.g., DVDs), memory controllers and/or other storage, as is well known. The device interfaces 412 may include various components to interface with external components, such as the output devices 304 and the input devices 306, as is generally known to those of ordinary skill in the relevant art.

Using the access network interface 402, the network terminal 302 communicates with the service provider 102 (FIGS. 1 and 2) to send and receive high speed communications for television programming, enhanced television services, and subscriber account management over the access network 108 (FIGS. 1-4). The access network interface 402 (FIG. 4) may include various components to allow for communications over the access network 108 in one or more forms, depending on the implementation. For example, the access network interface 108 may include an RF interface to receive RF signals and/or an optical interface to receive optical signals. The access network interface 402 may further include components to distinguish between and process various communications carried over the access network 108. For example, the access network interface 402 may include components to receive broadcast-television-formatted transmissions (e.g., NTSC, MPEG) and/or packet-data-formatted transmissions (e.g., Ethernet, IP). In some embodiments, the access network interface 402 may also be connected to the device interface 412, for example, to provide broadcast television transmissions to the output devices 304.

The storage system 410 may include various modules executable by the control system 408 and implementing various features in preferred embodiments. For example, the storage system 410 stores a user interface 404 comprising one or more displays including an interactive program guide (IPG) which may be provided on the outputs 304 to enable the subscriber 106 to communicate with the network terminal 302, select content for viewing, and access enhanced viewing features. The user interface 404 may include various user interfaces to utilize enhanced television services available through the service provider 102 (FIGS. 1-2), for example, downloaded from the service provider 102. Subscriber data 406 (FIG. 4) may also be stored in the storage system 410 to support enhanced television services. For example, a subscriber or user's viewing preferences, settings, programs already viewed, and Instant Messaging (IM) screen name or identifier may be stored as the subscriber data 406. In another example, the subscriber data 406 may be stored outside the network terminal 302, such as at the service provider 102 of FIG. 2 (e.g., in the subscriber database 208) or on a computing system or other device controlled by the subscriber or user (e.g., a smart card). The network terminal 302 may include fewer or more components than are shown in FIG. 4, and/or may be interconnected in various ways using buses, both of which are well known to those of ordinary skill in the relevant art.

Enhanced Television Services

Illustratively, the access network 108 (FIGS. 1-4) is a high-bandwidth bidirectional network that provides one or more enhanced television services including convergence of IM and IPG functionalities. These functionalities include displaying IM presence information in an IPG for each of a plurality of subscribers 106 (FIG. 1) or users on a subscriber or user's buddy list, or for displaying IM presence information in the IPG for each of a plurality of subscribers or users that are viewing or have viewed a specific program or programs in the IPG. The service provider 102 (FIG. 2) may provide a multitude of enhanced services to a subscriber by allowing the subscriber to connect with the service provider 102 via the high-bandwidth bidirectional access network 108 (FIGS. 1-4) to obtain, configure and control the delivery of the foregoing IM and IPG information. A preferred embodiment utilizes a fiber optic access network, a cable-based network, an Ethernet-based network, a wireless network, satellite communications, or various combinations thereof, although other high-bandwidth technologies could also be used. Fiber optic connections provide much more bandwidth for transmitting data than conventional connections using radio waves or coaxial cable. Fiber, for example, can easily carry hundreds or even thousands of channels of television content, telephone services, and data services (e.g., Internet access). To leverage the additional bandwidth and quality of fiber connections, service providers may offer a wide range of enhanced television services to attract and retain subscribers.

The enhanced television services may include, for example, any of personalized television channels, synchronized sharing of personal content among subscribers, direct access to supplemental television content, integrated chat and presence information on television, and interactive entertainment. The subscribers 106 (FIG. 1) or users may enjoy these services from their premises using familiar devices (e.g., the set-top box 312, FIG. 3(*b*), the television 314, the remote control 316, etc.). In some embodiments, subscribers 106 (FIG. 1) may have the option of using a computer or other device connected to the Internet to further customize or enhance television services.

IPG-Integrated IM Chat and Presence

One implementation of an enhanced television service provided by preferred systems and methods according to exemplary embodiments is IPG-integrated IM chat and presence capabilities. Instant message chat allows users to send and receive communications using their television. According to an illustrative embodiment, once an IM communication is initiated, a portion of the television screen may be dedicated to sending and receiving instant messages while the rest of the screen may display a video transmission. The dedicated portion may be referred to as a window. The user may type and receive communications (e.g., lines of text) that are displayed in the window.

To facilitate instant messaging, a subscriber or user may create a list of other users designated as "buddies." A subscriber or user may exchange instant messages with selected buddies from the list, which may be displayed on the subscriber or user's television screen. The list of names of buddies may include a subscriber or user identification (e.g., a "screen name" or other user ID), and may also include subscriber or user status information, such as presence status information that would allow a user to determine the presence status of another user. Presence status may include, for example, whether the other user is online (e.g., watching TV), offline (e.g., TV off), busy (e.g., watching TV, but not accepting messages), or away.

In some embodiments, "online" or "offline" may indicate whether a user is connected to the system or active with the system, e.g., interacting with the system controls, watching television, messaging, etc. "Busy" may indicate that the user is connected to the system but is not available for instant messages. For example, the user may be using a telephone or may have turned instant messaging off "Away" may indicate that the user is connected to the system, but is away from the television. Processes may be implemented to detect user presence status and communicate changes in status within the messaging system.

Presence information on the buddy list may also include information identifying the video transmission (e.g., a television broadcast) that the user is watching or other information about the user's television watching session(s), such as last shows watched, length of viewing session, channel changing intervals, etc. Such information may be used in communications with other users. For example, a user may send messages to the other users who are watching the same program, or invite other users to watch a program that the user recommends.

Instant messages may be transmitted from the originating user's network terminal, such as the set top box 312 (FIG. 3(b)), over the access network 108. Such instant messages may contain the communication by the originating user, as well as user identification(s) for the destination user(s). The presence system may use the user identifications to determine appropriate destination set top boxes to receive the instant message, for example, by mapping the user identifications to a unique identifier associated with the user (e.g., a network address of a set top box associated with the user). Upon receiving the instant message, the set top box 312 for a destination user may cause the information in the instant message to appear in a designated portion of the television display, such as the bottom portion of the display, while the rest of the display shows the video transmission the user is currently receiving.

Table 1 illustrates exemplary buddy list information:

TABLE 1

| Buddy List | User Presence Status | Program |
|---|---|---|
| Biff | Online | Medium |
| Alicia | Offline | |
| Chen | Away | Lost |
| Drake | Online | Lost |
| Edward | Busy | |

Figure 5:
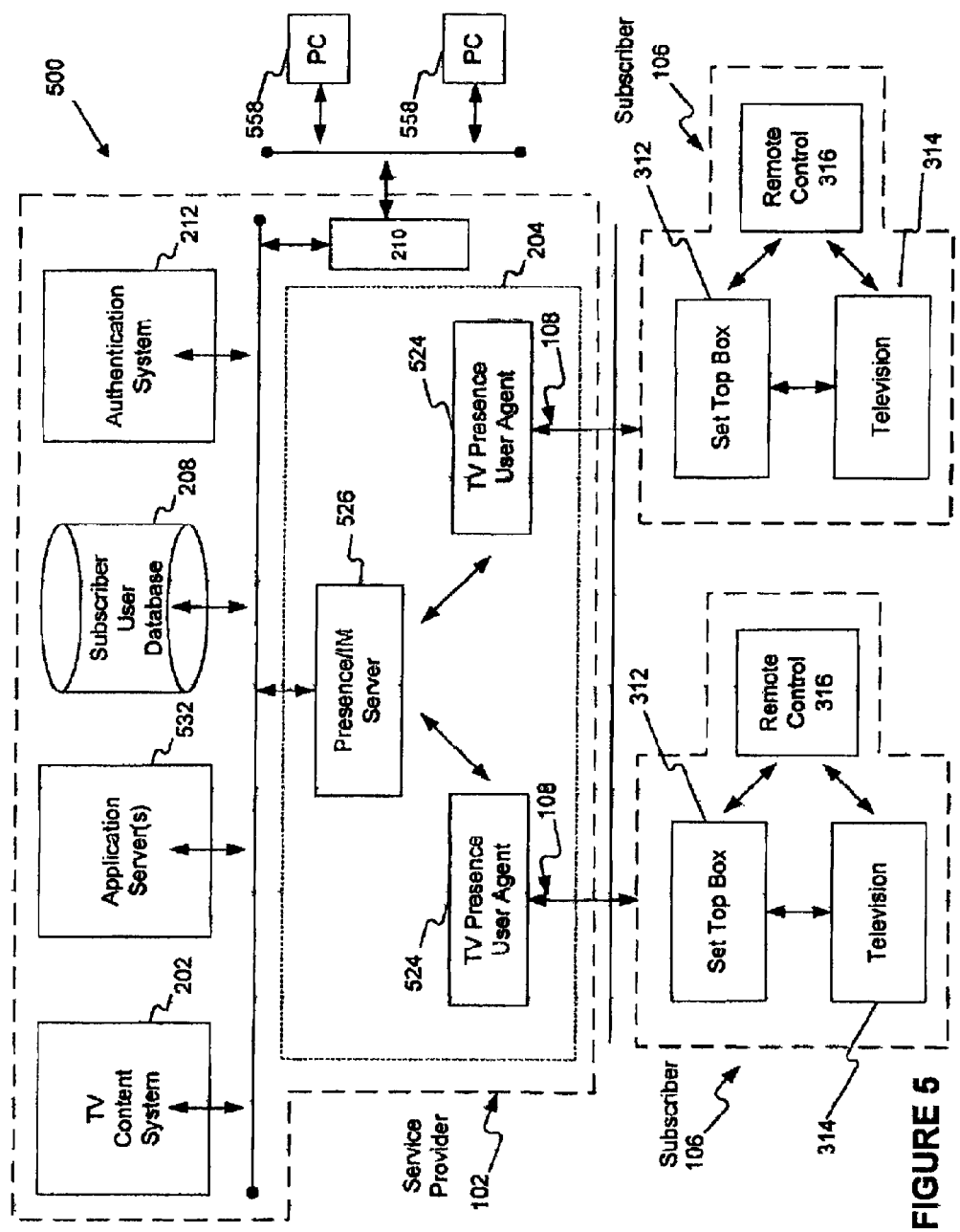
FIG. 5 is a detailed block diagram of an exemplary integrated IM and chat presence system for providing IPG and IM convergence.

FIG. 5 is detailed block diagram of an exemplary integrated IM and chat presence system 500 for providing interactive program guide and instant messaging convergence. The integrated IM and chat presence system 500 uses the set top boxes 312 as the network terminals 302, the televisions 314 as the output devices 304, and the remote controls 316 as the input devices 306. As noted above, other configurations are possible. As shown, the system 500 includes a service provider, such as the service provider 102, that includes a television content system, such as the television content system 202; a subscriber database, such as the subscriber database 208; and an authentication system, such as the authentication system 212. The system 500 also includes an application server 532, a presence/IM server 526 and TV presence user agents 524, which may be implemented as part of an enhanced television services system, such as the enhanced television services system 204. The system 500 also includes a plurality of users or subscribers 106 each having a set top box, such as the set top box 312; a remote control, such as the remote control 316; and a television, such as the television 314. The subscriber 106 is communicatively connected to the service provider 102, for example, via the access network 108 (e.g., a fiber optic network). The system 500 may also include one or more computing devices (PCs) 558, which may be connected to the service provider 102 via a portal, such as the portal 210, and a wide area data network, such as the Internet.

According to exemplary embodiments, the interactive program guide (IPG) is sent within a broadcast transport stream transmitted by the television content system 202 or alongside the broadcast stream transmitted by the television content system 202 in a special data channel. In the United States, the Advanced Standards Television Committee (ATSC) standard for digital television (DTV) uses tables sent in each station's program and system information protocol (PSIP), for example. These tables contain the program start time and title, and additional program descriptive "metadata". Moreover, these devices receive time signals from local Public Broadasting Service (PBS) members so that the set top box 213 can record on time. Many IPG systems, however, rely upon third party "metadata aggregators" (companies such as Tribune TV Data, Gemstar-TV Guide in the U.S. and Europe and Broadcasting Dataservices in Europe), to provide good quality data content. Newer media centers (PC based multi-channel TV recorders) and Digital Video Recorders may use an internet feed for the IPG. This enables two-way interactivity for the user so that media download can be requested via the IPG, or related link, and remote programming of the set top box 213 can be achieved.

PSIP defines virtual channels and content ratings, as well as IPGs with titles and (optionally) descriptions to be decoded and displayed by an ATSC tuner or the set top box 213. PSIP is also used to send the exact time referenced to UTC (Universal Coordinated Time) and GPS time; a station ID, as well as network IDs; and conditional access information for a broadcast. PSIP is defined in ATSC standard A/65, the most recent revision of which is A/65C, published in 2006. TV Guide On Screen is a different, proprietary system provided by datacasting on a single station, while PSIP is required, at least in the United States, to be sent by every digital TV station. PSIP information may be passed through the airchain using proprietary protocols, or through use of the XML-based Programming Metadata Communication Protocol (PMCP, or ATSC A/76) facility metadata scheme.

Psip Includes the Follwing Data Fields:

STT (system time table)—current time, transmitted at least once per second, with an accuracy of new time values within 1 second or better;

MGT (master guide table)—data pointers to other PSIP tables;

TVCT (terrestrial virtual channel table)—defines each virtual channel and enables event information tables (EITs) to be associated with the channel;

CVCT (cable virtual channel table)—assigns numbers to each virtual channel and enables EITs to be associated with the channel;

RRT (rating region table)—content ratings for each country (region) covered by the station, save the U.S., as that region is loaded into TV sets already;

EIT (event information table)—titles and program guide data;

ETT (extended text table)—detailed descriptions of channels (Channel Extended Text Table or CETT) and aired events (Event Extended Text Table or EETT);

DCCT (directed channel change table); and

DCCSCT (directed channel change selection code table)—provides for the ability to update states, counties and program genres used in DCCT tables.

The TV presence user agent 524 allows the users 106 to communicate with a presence/IM server, such as the server 526, and consequently enables communication among IM users using the PCs 558, other users 106, and other presence-enabled devices accessible via the system 500, such as telephones, personal digital assistants (PDAs), laptop computers, or other devices. In another embodiment, the presence/IM server 526 may integrate with other existing IM and presence systems existing on both wired and wireless networks external to the system 500 (e.g., via the portal 210 over the external data network). The system 500 may monitor the activity of the subscriber 106 or user through the subscriber's TV presence user agent 524. The user agents 524 may be deployed as software residing on the user set top boxes 312, or may be deployed within the service provider 102 (e.g., as a proxy), as shown in FIG. 5. As noted above, a user may compile a list of other users who are designated as buddies, called a buddy list, which may store presence information related to such users, for example, accessible by the user's user agent 524. The presence/IM server 526 and the user agents 524 can track and propagate presence status changes for users that a particular user has on his buddy list, and update the buddy list appropriately. Some embodiments may provide a user with the functionality of Presence Availability Management (PAM) and IM systems, including services for sending and receiving instant voice or text messages, making and receiving telephone calls and receiving voice alerts and notifications.

The system 500 may keep track of each buddy who is online and what channel and program the buddy is watching. This information may be incorporated into an IPG, as will be described in more detail with reference to FIG. 6. Returning to FIG. 5, the subscriber 106 may invite an online buddy (or buddies) to watch a particular program using an instant message. The buddy may then select the message that appears on his television screen to automatically change the channel on his or her TV set to the program identified in the instant message. In one embodiment, the set top box 312 may store and modify presence status in real-time, including the television-control status of the set top box 312, and communicate the status information via notifications to the presence/IM server 526 without user interaction. Such a configuration may enable the presence/IM server 526 to generate notifications indicating a change in status information including, for example, a "channel changed" alert to be sent to other buddies.

In another embodiment, the functions and/or hardware of the set top box 312 may be integrated into the television 314. In yet another embodiment, the remote control 316 may also be enabled to receive and display instant messages as an output device using, for example, an LCD display.

In another embodiment, the presence/IM server 526 is configured to automatically group users who are watching the same program, forming an ad hoc buddy list based on a television-related action. The presence/IM server 526 may form other ad hoc buddy lists based on other television habits of users, such as frequent viewing times, channels, programs, networks, program genre, typical program demographics, and location. The subscriber 106 and the buddies on an ad hoc list may exchange instant messages.

Figure 6A:
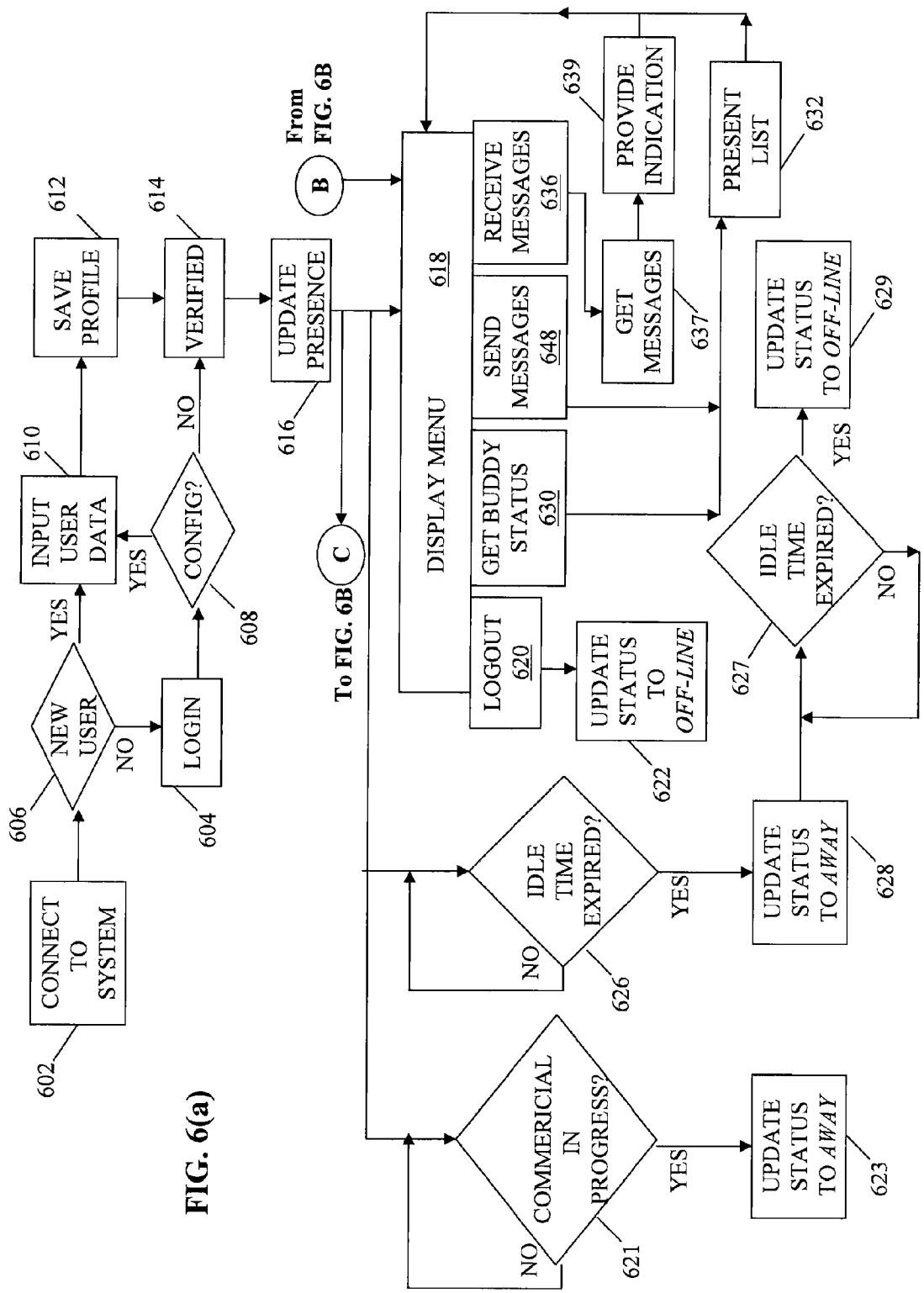
FIGS. 6(a)-6(b) together comprise a flowchart of an exemplary method for providing IPG and IM convergence using the system of FIG. 5.
Figure 6B:
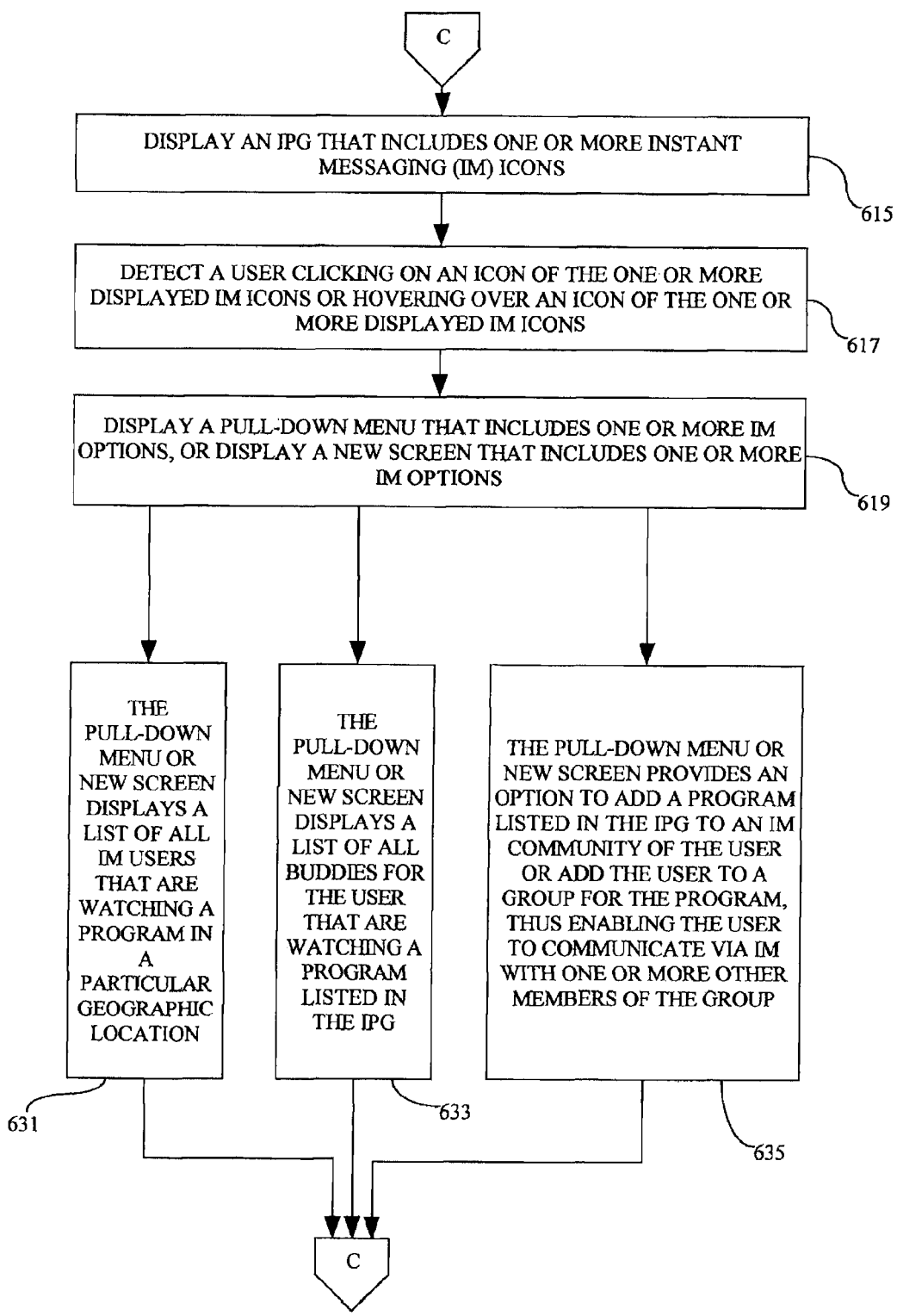

FIGS. 6(a)-6(b) together comprise a flowchart of an exemplary method 600 for providing interactive program guide and instant messaging convergence using the integrated IM and chat presence system 500 of FIG. 5. The method of FIGS. 6(a)-6(b) commences at block 602 (FIG. 6a) where the service provider 102 (FIG. 2) receives a connection signal that may be initiated by the subscriber 106 (FIGS. 1, 3(a)-3(b)). The subscriber 106 may initiate connection using the remote control 316 (FIG. 3(b)) or by another means such as controls on the set top box 312. Using the connection signal, the service provider 102 (FIG. 2) determines whether the subscriber 106 is a new user (FIG. 6(a), block 606). If so, the service provider 102 (FIG. 2) receives user data (FIG. 6(a), block 610) that is entered via the set top box 312 (FIG. 3(b)) by the subscriber 106 (FIGS. 1, 3(a)-3(b)) using the remote control 316 (FIG. 3(b)) or the set top box 312. The service provider 102 (FIG. 2) then saves the user data from the subscriber 106 (FIGS. 1, 3(a)-3(b)) in a user profile (FIG. 6(a), block 612) that may include a user name, a password, and a telephone number. Once the profile is saved, the service provider 102 (FIG. 2) verifies (FIG. 6(a), block 614) the user data, for example, against the data in the subscriber database 208 (FIG. 2) and/or via the authentication system 212.

Authentication allows the subscriber 106 (FIGS. 1, 3(a)-3(b)) to gain access to various portions of the system 500 (FIG. 5) such as, for example, the enhanced television services system 204 (FIG. 2). Referring again to block 606 (FIG. 6(a)), if the user is an established user, the system 500 (FIG. 5) will log him in (FIG. 6(a), block 604) using, for example, a user name (which may or may not be the same as the user identification used for instant messaging purposes) and password. The service provider 102 (FIG. 2) then gives the subscriber 106 (FIGS. 1, 3(a)-3(b)) an option to configure (FIG. 6(a), block 608) his or her user profile, such as by changing his password or specifying his or her presence status.

The service provider 102 (FIG. 2) receives the user data (FIG. 6(a), block 610) and continues by saving the updated user profile (block 612) and verifying the subscriber with authentication procedures (block 614). If the subscriber chooses not to update his or her profile or other information (block 608), the system 500 (FIG. 5) performs the verification process (FIG. 6(a), block 614). Once the service provider 102 (FIG. 2) has verified the subscriber 106 (FIGS. 1, 3(a)-3(b)), the presence status of the subscriber 106 is updated (FIG. 6(a), block 616). As described previously, a user's presence status in the preferred embodiment may include online, offline, busy, or away statuses.

Pursuant to one illustrative embodiment, once the user or subscriber 106 (FIGS. 1, 3(a)-3(b)) is logged in, the system 500 (FIG. 5) provides chat and presence capability within the IPG as the user accesses the service provider 102 (FIG. 2) over the access network 108 using the set top box 312 (FIG. 3(b)). As the user watches the television 314, the system 500 (FIG. 5) monitors the user's activities and status, monitors the activities and status of other system users, interacts with the user through the user's television, and provides presence information and communication links among users.

For example, the system 500 (e.g., via the user agent 524) monitors a user's status by determining whether the user has used the remote control 316 (FIG. 3(b)) and/or set top box 312, for example, by monitoring whether an idle timer has expired (FIG. 6(a), block 626). The remote control 316 (FIG. 3(b)) or set top box 312 may be considered idle if the remote control or set top box has not been used for a specified period of time. In such an embodiment, at or near expiration of the idle time (e.g., fifteen minutes from last user action), the user may be prompted to take action in order to preserve the user's status as "available." For example, a small picture representation serving as a warning of idle time expiration may be displayed by the set top box 312 on the television 314, partially obstructing the view of the current broadcast. Alternatively, a text message containing a warning may be displayed on the television screen indicating a pending user status change to "away" unless action is taken.

Upon seeing such notifications, the user may elect to preserve or reactivate "available" status by performing actions including, for example, changing channels, changing volume, or pushing an "I'm available" button on the remote control 316. If the user takes no action, the user's status may be updated accordingly to "away" (FIG. 6(a), block 628), for example, by a notification from the user agent 524 (FIG. 5) to the presence/IM server 526 indicating the change in status of the user. In the implementation shown, the system 500 (FIG. 5) may further monitor whether user interaction occurs before another idle timer, for example a thirty-minute timer, has expired (FIG. 6(a), block 627) after the initial idle period. If the second idle time also expires without user activity, then a notification may be sent to the presence/IM server 526 (FIG. 5) to update the subscriber's status to off-line (FIG. 6(a), block 629).

In one embodiment, a motion detector, seat sensor, or other sensor may be used to detect user activity or physical presence near a television set sufficient to prevent the system 500 (FIG. 5) from updating the user's status based on idle time. One of ordinary skill will recognize that other sensors and methods may be employed to monitor a user's status, for example, an IR sensor built into the television set to detect a user's body heat. For another example, sensors and/or software (e.g. software in the telephone call connection network) may detect that a user is speaking on a telephone, including a cell telephone, and the system may change the user's status to busy during the duration of the call. For yet another example, sensors and/or software (e.g., an application running on a networked computer) may detect when a user is interacting with a personal computer, and the system may change the user's status to busy during the interaction. For yet another example, sensors and/or software (e.g., an application running on a computer-controlled appliance) may detect when a user is interacting with an appliance, such as a microwave oven or refrigerator, and the system may change the user's status to busy during the interaction.

The system 500 may also update a user's presence status based on the status of a television program that the user is tuned to. For example, the system 500 may determine whether a commercial break (i.e., an advertising segment that is not part of the television show) is in progress during a program being displayed on the television (FIG. 6(a), block 621), and if so, may change the subscriber's presence status to "away" during the commercial break (block 623) on the assumption that the user is not attentively watching the television during a commercial break. When the commercial break ends, the system 500 (FIG. 5) may update the subscriber's status to online, busy, or whatever is appropriate for the user.

In the embodiment shown, a user may interact with the system 500 (FIG. 5) through an IPG displayed by the set top box 312 (FIG. 3(b)) on the television 314 (e.g., using the user interface 404, FIG. 4), and also through an optional menu for controlling chat and presence features and functions. Once presence is updated (block 616 of FIG. 6(a)), then the procedure progresses to any of blocks 621, 626, or 618 or, alternatively, to block 615 (FIG. 6(b)) where an IPG is displayed that includes one or more instant messaging (IM) icons. If the program progresses, for example, to block 615, then next, at block 617, a user is detected clicking on an icon of the one or more displayed IM icons, or hovering over an icon of the one or more displayed IM icons. Next, at block 619, a pull-down menu is displayed that includes one or more IM options, or a new screen is displayed that includes one or more instant messaging options. The pull-down menu or new screen may display a list of all IM users that are watching a program in a particular geographic location, such as a city, state, county, or nation (block 631). Alternatively or additionally, the pull-down menu or new screen may display a list of all buddies for the user that are watching a program listed in the IPG (block 633). Alternatively or additionally, the pull-down menu or new screen may provide an option to add a program listed on the IPG to an IM community of the user or add the user to a group for the program, thereby enabling the user to communicate with one or more other members of the group (block 635).

Alternatively or additionally, the pull-down menu or new screen displayed by the set top box 312 (FIG. 3(b)) on the television 314 may display a number of items related to communication and presence (FIG. 6(a), block 618). A user may select a menu item using a remote control, television controls, or set top box controls. For example, when a subscriber selects "logout" (block 620) from a menu, a notification may be sent from the user agent 524 (FIG. 5) to the presence/IM server 526 in order to update the subscriber's status to offline (FIG. 6(a), block 622) in the database 208 (FIG. 2), and propagate the new status to other relevant subscribers through the TV presence user agents 524 (FIG. 5). From any of blocks 631, 633, or 635 (FIG. 6(b)), the procedure advances to any of blocks 620, 630, 648, 636, 621, or 626 (FIG. 6(a)).

As shown, if the subscriber 106 (FIGS. 3(a) and 3(b)) selects "get buddy status" (FIG. 6(a), block 630), or selects "send messages" (block 648) from the menu, the system 500 (FIG. 5) will display a list of the subscriber's buddies in an IPG on the subscriber's television (block 632, FIG. 6(a)). Alternatively or additionally, the subscriber's buddies may be displayed automatically on the IPG. The IPG may include such information as their presence status and what channel and program a buddy is watching. As described previously, Table 1 represents exemplary buddy list information, which may be stored in (or accessible to) the user agent 524 (FIG. 5).

For example, if a subscriber, such as the subscriber 106, selects the IM menu item "receive messages," (FIG. 6(a), block 636), the system 500 (FIG. 5) determines whether there are messages for the subscriber (FIG. 6(a), block 637). If there are no messages, the system 500 (FIG. 5) will provide an appropriate indication (FIG. 6(a), block 639), such as displaying an icon or text on the television, and continue displaying the menu (block 618). If there are messages, the system 500 (FIG. 5) will provide an indication by, for example, displaying them (FIG. 6(a), block 639).

Figure 7:
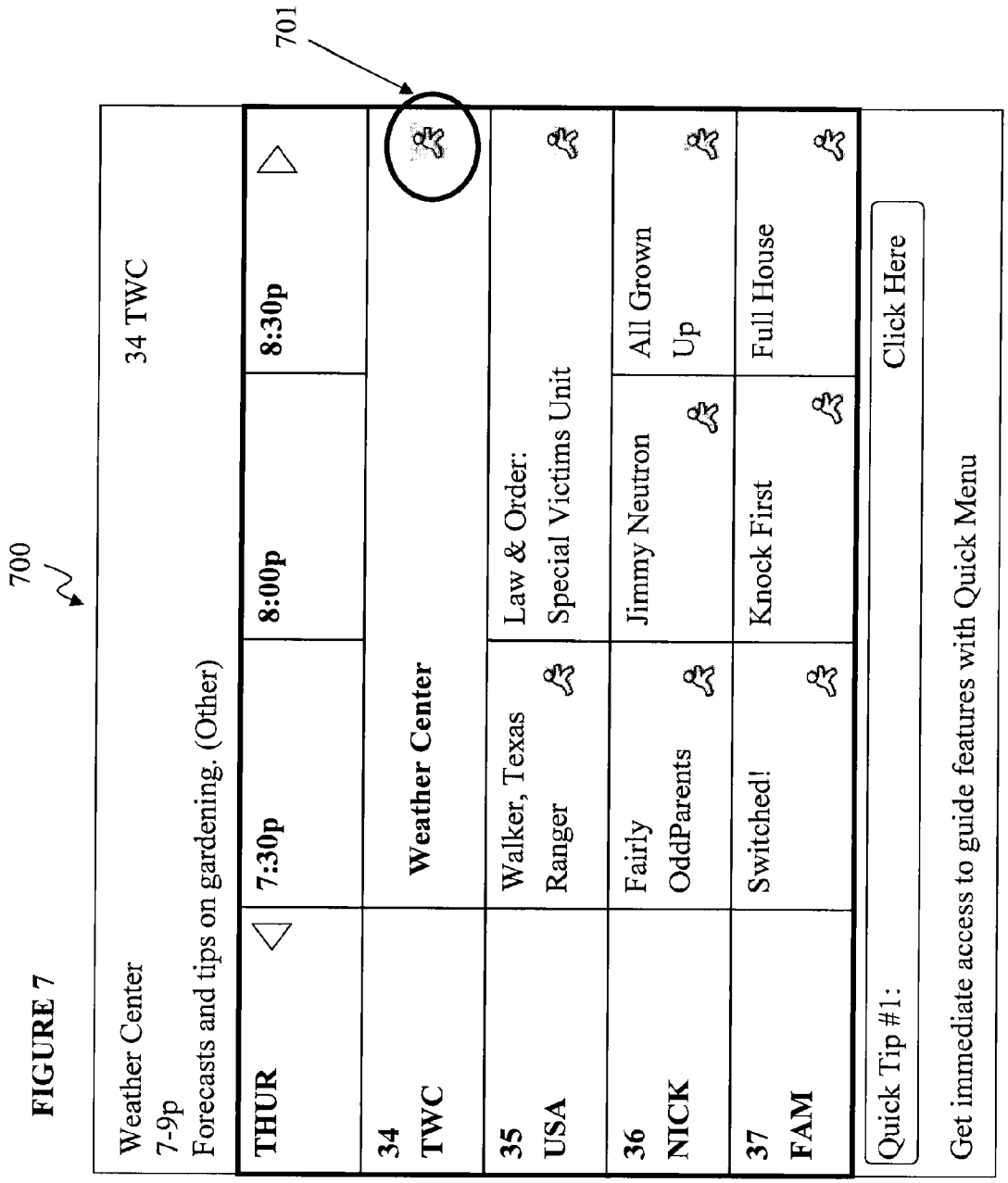
FIG. 7 illustrates a first exemplary embodiment of a graphical user interface for displaying one or more IM presence indicators in an IPG.

FIG. 7 illustrates a first exemplary embodiment of a graphical user interface 700 for displaying one or more IM presence indicators in an IPG. The graphical user interface 700 may be presented, for example, on the television 314 (FIG. 3(b)). Returning to FIG. 7, if a user clicks on an IM presence indicator icon 701 or hovers over the icon 701, the user is presented with a pull-down menu or taken to another screen that provides one or more IM menu options.

FIG. 8 illustrates a second exemplary embodiment of a graphical user interface 800 for displaying one or more IM presence indicators in an IPG. The graphical user interface 800 may be presented, for example, on the television 314 (FIG. 3(b)). Returning to FIG. 8, if a user clicks on an IM presence indicator icon 801 or hovers over the icon 801, for programs that occur in the past or in the future, the user may chat with other IM users (based on geography, users included in the buddy list) that have either watched or recorded the program, or have the program selected for a reminder or future recording.

Figure 9:
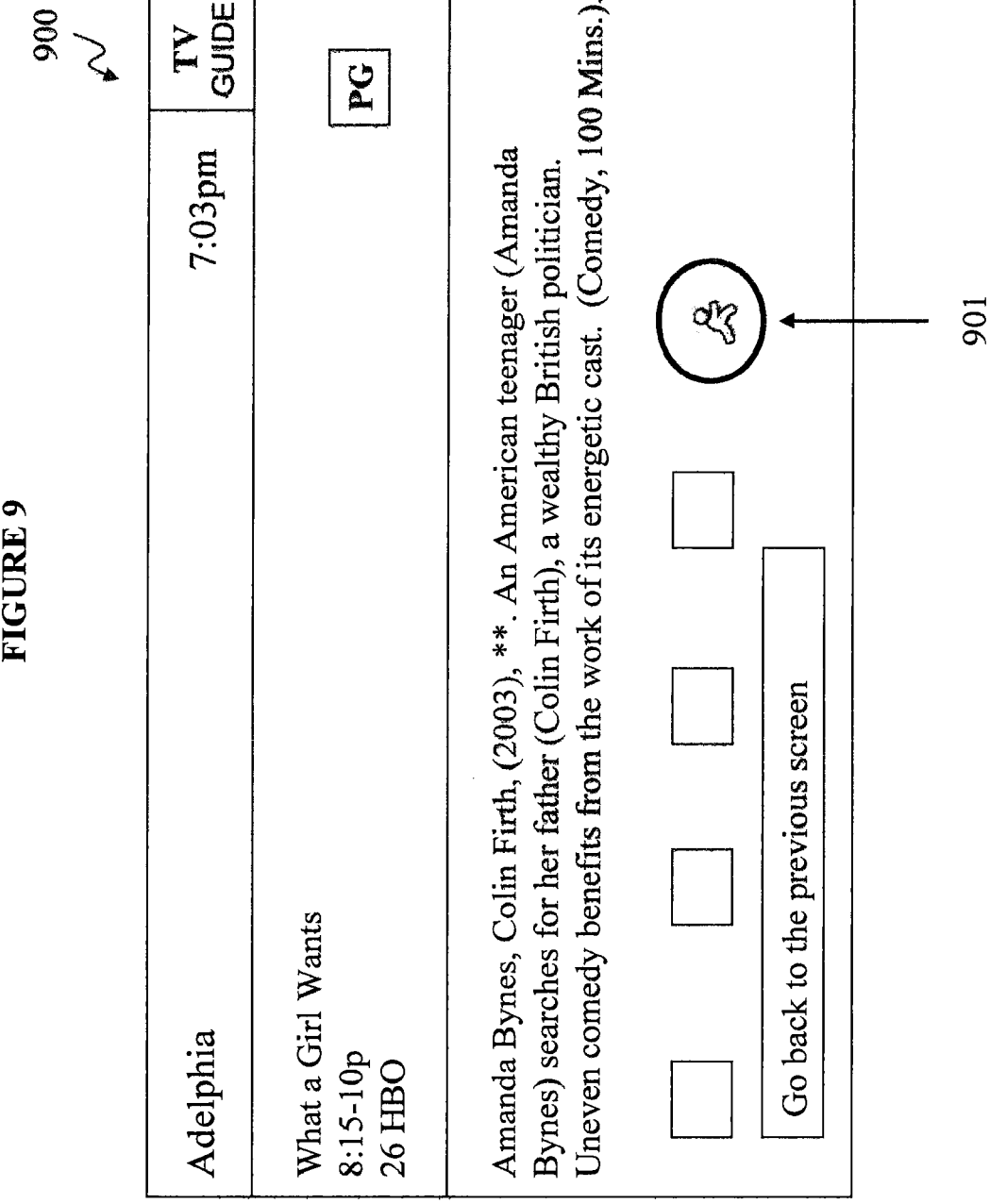
FIG. 9 illustrates a third exemplary embodiment of a graphical user interface for displaying one or more IM presence indicators in an IPG.

FIG. 9 illustrates a third exemplary embodiment of a graphical user interface 900 for displaying one or more IM presence indicators in an IPG. The graphical user interface 900 may be presented, for example, on the television 314 (FIG. 3(b)). Returning to FIG. 9, if a user selects a program from the IPG to view its expanded description, an IM presence indicator icon 901 is displayed. By clicking on or hovering over the icon 901, a link is activated that provides IM convergence.

FIG. 10 illustrates a fourth exemplary embodiment of a graphical user interface 1000 for displaying one or more IM presence indicators in an IPG. The graphical user interface 1000 may be presented, for example, on the television 314 (FIG. 3(b)). Returning to FIG. 10, an IM presence indicator icon 1001 is displayed in any IPG screen that presents a guide or IPG data. By clicking on or hovering over the icon 1001, a link is activated that provides IM convergence.

Figure 11:
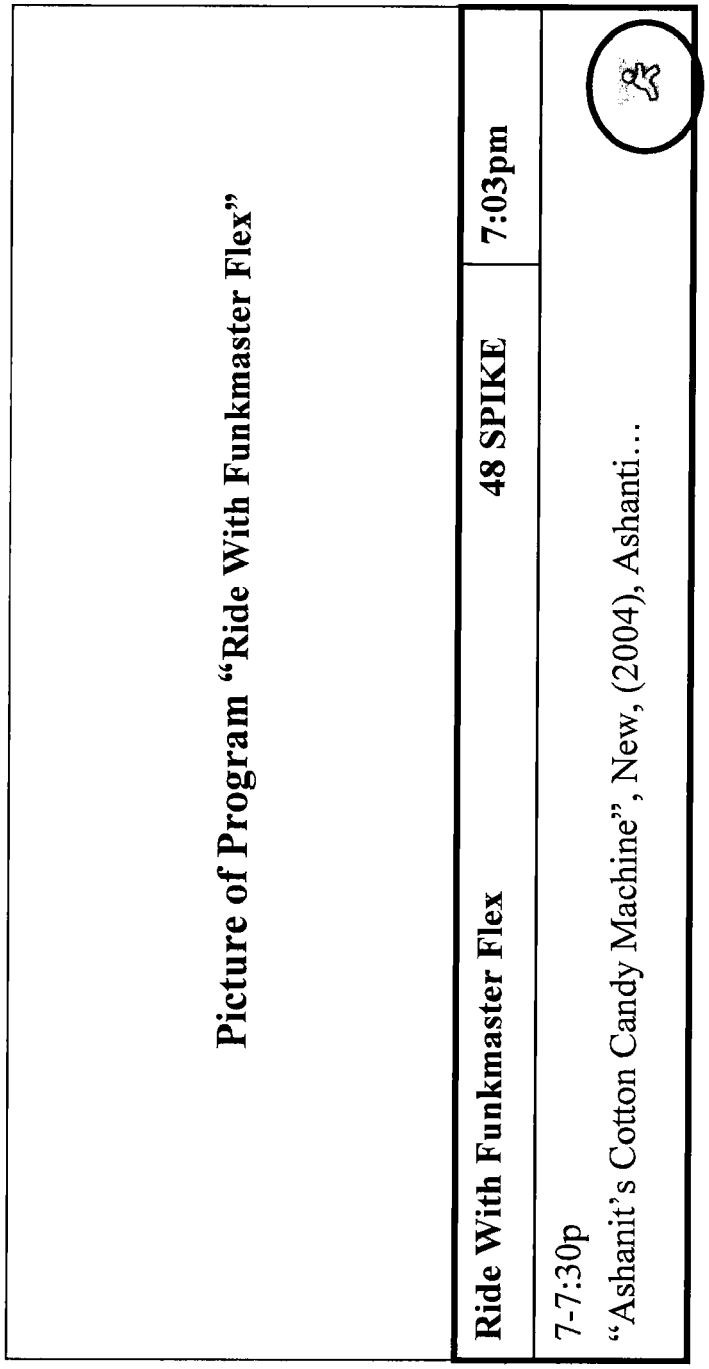
FIG. 11 illustrates a fifth exemplary embodiment of a graphical user interface for displaying one or more IM presence indicators in an IPG.

FIG. 11 illustrates a fifth exemplary embodiment of a graphical user interface 1100 for displaying one or more IM presence indicators in an IPG. The graphical user interface 1100 may be presented, for example, on the television 314 (FIG. 3(b)). Returning to FIG. 11, an IM presence indicator icon 1101 is displayed in any IPG screen that presents a guide or IPG data. By clicking on or hovering over the icon 1101, a link is activated that provides IM convergence.

There can be a computer program product or hardware product for providing IPG and IM convergence. The system includes a computer operatively coupled to a signal bearing medium via an input/output interface (I/O). The signal bearing medium may include a representation of instructions for providing IPG and IM convergence, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer includes a processor that processes information for providing IPG and IM convergence, wherein the information is represented, e.g., on the signal bearing medium and communicated to the computer via the I/O, wherein the processor saves information as appropriate into a memory. This information may also be saved into the memory, e.g., via communication with the I/O and the signal bearing medium.

The processor executes a program for providing IPG and IM convergence. The processor implements instructions for displaying an interactive program guide (IPG) that includes one or more instant messaging (IM) icons. A user is detected clicking on an icon of the one or more displayed IM icons, or hovering over an icon of the one or more displayed IM icons. A pull-down menu is displayed that includes one or more IM options, or a new screen is displayed that includes one or more instant messaging options. The pull-down menu or new screen displays a list of all IM users that are watching a program listed in a particular geographic location. Alternatively or additionally, the pull-down menu or new screen displays a list of all buddies for the user that are watching a program listed in the IPG. Alternatively or additionally, the pull-down menu or new screen adds a program listed on the IPG to an IM community of the user or adds the user to a group for the program, thereby enabling the user to communicate with one or more other members of the group. The foregoing steps may be implemented as a program or sequence of instructions within the memory, or on a signal bearing medium, such as the medium, and executed by the processor.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing interactive program guide and instant messaging convergence, the method comprising:

displaying an interactive program guide comprising times and channels for a plurality of television programs to a user viewing a program on a television, in which the interactive program guide comprising the times and the channels for the plurality of television programs automatically displays a plurality of instant messaging buddies viewing the program in the interactive program guide itself;

displaying in the interactive program guide itself a presence status for each of the plurality of instant messaging buddies viewing the program;

in response to one instant messaging buddy in the plurality of instant messaging buddies being engaged in a telephone call, changing the presence status displayed in the interactive program guide to busy for the one instant messaging buddy for a duration of the telephone call;

in response to another instant messaging buddy in the plurality of instant messaging buddies interacting with a home appliance, changing the presence status displayed in the interactive program guide to busy for the another instant messaging buddy for a duration of interacting with the home appliance;

selecting an instant message presence indicator icon corresponding to a future television program; and chatting with instant messaging user, based on geographical locations of the plurality of instant messaging buddies who have selected the future television program for future recording, and are thereby associated with the selected instant message presence indicator icon.

2. The method of claim 1 wherein a screen displays a list of all instant messaging users that are watching the program in a particular geographic location.

3. The method of claim 2 wherein the geographic location comprises a city.

4. The method of claim 1 wherein a screen displays a list of all the plurality of instant messaging buddies for the user that are watching the program listed in the interactive program guide.

5. The method of claim 1 wherein a screen provides an option to add the program listed on the interactive program guide to an instant messaging community of the user, which enables the user to communicate with other members of a group.

6. The method of claim 1 further comprising:

responsive to the user selecting the program from the interactive program guide to view its expanded description, displaying an instant messaging icon; and activating a link that provides instant messaging convergence in response to detection of the user clicking on the instant messaging icon.

\* \* \* \* \*